United States Patent
Nitschke et al.

(10) Patent No.: US 6,449,545 B1
(45) Date of Patent: Sep. 10, 2002

(54) METHOD FOR DATA TRANSFER IN A RESTRAINT SYSTEM CONNECTED TO A BUS LINE

(75) Inventors: Werner Nitschke, Ditzingen; Otto Karl, Leonberg; Joachim Bauer, Oberstenfeld-Prevorst; Michael Bischoff, Adelschlag; Günter Fendt, Schrobenhausen; Johannes Rinkens, Ingolstadt; Stefan Schaefer, Schrobenhausen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/647,441
(22) PCT Filed: Mar. 18, 1999
(86) PCT No.: PCT/DE99/00757
§ 371 (c)(1),
(2), (4) Date: Dec. 26, 2000
(87) PCT Pub. No.: WO99/50160
PCT Pub. Date: Oct. 7, 1999

(30) Foreign Application Priority Data

Mar. 25, 1998 (DE) .......................................... 198 13 923

(51) Int. Cl.[7] .............................................. G06F 17/00
(52) U.S. Cl. ........................................ 701/45; 701/33
(58) Field of Search .............................. 701/45, 46, 47, 701/29, 33

(56) References Cited

FOREIGN PATENT DOCUMENTS

| DE | 35 06 118 | 8/1986 |
|----|-----------|--------|
| DE | 38 11 217 | 10/1989 |
| DE | 195 19 130 | 12/1996 |
| DE | 195 46 359 | 6/1997 |
| EP | 0 788 929 | 8/1997 |
| EP | WO 99/50100 | 10/1999 |

OTHER PUBLICATIONS

J. Bauer et al., "Bussytem zur Vernetzung von Aktuatoren für Rückhaltesysteme," Conference Proceedings of the SAE International Congress & Exposition (Feb. 24–27, 1997).**

*Primary Examiner*—William A. Cuchlinski, Jr.
*Assistant Examiner*—Edward Pipala
(74) *Attorney, Agent, or Firm*—Kenyon & Kenyon

(57) ABSTRACT

A central control unit and a plurality of data processing units are connected to a bus line and are provided to control restraint devices. The central control unit sends query signals or control signals in the form of data telegrams to all or certain individual data processing units and the data processing units send response signals back to the central control unit in response to certain query signals or control signals. To permit a reliable allocation of query signals and control signals to data processing units and reliable acquisition of monitoring data of data processing units and their restraint devices, the query signals or control signals and the response signals are data telegrams, all of which have the same frame structure, having a first region with n control bits, a second region with m information bits and a third region with p check bits.

9 Claims, 2 Drawing Sheets

METHOD FOR DATA TRANSFER IN A RESTRAINT SYSTEM CONNECTED TO A BUS LINE

FIELD OF THE INVENTION

The present invention relates to a method of data transmission in a restraint system networked over a bus line for occupants of a vehicle, where a central control unit and a plurality of data processing units are connected to the bus line and are provided at various locations in the vehicle to control restraint devices, and the central control unit sends query signals or control signals in the form of data telegrams to all or certain individual data processing units and the data processing units send response signals back to the central control unit in response to given query or control signals.

BACKGROUND INFORMATION

The efficiency of the restraint systems in vehicles will increase greatly in the future to further improve the protection of passengers in the vehicle. This means that the number of restraint devices and their respective deployment means in the vehicle will increase drastically. These restraint devices will then include, for example, airbags for the driver and front passenger, optionally with multi-stage deployment, knee bags for the driver and front passenger, side airbags for the driver, front passenger and rear passengers, with side airbags possibly being provided for the head area as well as the chest area, seat belt tensioners which may also be activated in multiple stages, possibly also rollover bars, etc. Thus, a complex safety system composed of multiple restraint devices will be installed in the vehicle for each occupant of the vehicle.

A complex restraint system is described in the article "Bussystem zur Vernetzung von Aktuatoren fur Ruckhaltesysteme" [Bus system for networking actuators for restraint systems] by J. Bauer, G. Mehler and W. Nitschke in the *Conference Proceedings of the SAE International Congress & Exposition*, Feb. 24–27, 1997 Detroit. Bulky wiring harnesses have been eliminated by the introduction of a bus system which networks all the restraint devices. With this conventional system, each restraint device has its own data processing unit having a processing unit, data input and output circuits, a memory unit, a time and clock base and a power supply. This data processing unit, which is also referred to as a peripheral intelligent ignition power module, is arranged in immediate proximity to the deployment means belonging to the respective restraint device, namely, in an ignitor cap or on a substrate of the ignitor itself.

From a central control unit, each data processing unit receives its power supply over a bus line. In addition, the central control unit determines on the basis of multiple sensor signals—e.g., acceleration sensors, precrash sensors, seat occupancy sensors—which restraint devices are to be deployed. Accordingly, the central control unit addresses the respective data processing units with the help of a protocol transmitted over the bus line. Diagnostic requests also go out over the bus line from the central control unit to the individual data processing units which send their diagnostic responses back to the central control unit over the bus line. These diagnostic queries are also sent out over the bus line in the form of a data telegram. This data telegram begins with a start bit, followed by several bits for addressing the addressed data processing unit and information bits. A check bit and a stop bit end the data telegram. If the data telegram contains a deployment command, the bits for the deployment command will be followed by several CRC check bits.

The response signal to a diagnostic query has only a few current pulses generated by short-circuiting of the two bus lines in the respective data processing unit. With a response formed in this way, there is the risk that the central control unit cannot assign this response unambiguously to the sending data processing unit and furthermore there might be an error in the response. In addition, no differentiation between different responses is possible with a response having only a few current pulses.

German Patent Application No. 35 06 118 describes a data bus system for motor vehicles in which data telegrams are used for data transmission between the stations connected to the bus, these data telegrams having a control bit region, an information bit region and a check bit region. This publication does not contain any information about special handling of deployment signals for restraint systems in transmission over a bus.

SUMMARY OF THE INVENTION

An object of the present invention is to provide a method that permits a reliable allocation of query signals and control signals to data processing units of the bus system and reliable acquisition of monitoring data of data processing units and their respective restraint devices and makes unambiguous assignments of deployment information to the restraint devices.

The object is achieved through the fact that the query signals or control signals and the response signals are data telegrams, all of which have the same frame structure, having a first region with n control bits, a second region with m information bits and a third region with p check bits, and the central control unit enters a deployment command into the region of the m information bits of the data telegram where each data processing unit is allocated at least one bit location of this region, and each individual data processing unit activates the restraint device(s) assigned to it only when the bit intended for it/them has been set.

Processing of the data telegrams in the central control unit and in the data processing units is simplified due to the fact that all data telegrams, both those sent out by the central control unit and those sent back by the data processing units, have the same structure. Various types of response information can be transmitted from the data processing units to the central control unit with a reliable allocation to the sending data processing unit because the response signals are sent back from the data processing units to the central control unit as complete data telegrams.

Advantageous refinements of the present invention are derived from the subordinate claims.

Synchronization bits can be placed in front of the data telegrams for the query signals or control signals, and stop bits can be added at the end of the frame. The synchronization bits facilitate bit clock synchronization in the data processing units.

The control bits in the data telegrams of the query signals or control signals are used to distinguish between different query commands or control commands. The data processing units notify the central control unit by way of the control bits in the data telegrams for response signals whether or not they can correctly execute the query commands or control commands.

Of the m information bits of the data telegrams of the query signals or control signals, a first portion can be used to address the data processing units and a second portion of the m information bits may contain either a selection of one or more memory registers in an addressed data processing unit so that the register content(s) is/are sent back to the central control unit with the response telegram, or the second portion of the m information bits may contain a request to one or more data processing units to execute a certain function. The data processing units enter the queried register contents into the region of their response telegram having m information bits.

The first portion of the m information bits in a query telegram may contain either the address of a single data processing unit selected by the central control unit or the simultaneous addressing of all data processing units connected to the bus line.

Data telegrams with query signals or control signals having a high priority and time urgency (e.g., deployment commands) can be transmitted with a higher signal level and higher bit rate than data telegrams with a lower priority and lower time urgency. This guarantees that at least the signal with the highest priority, namely a deployment command, will always reach the respective data processing unit, even if other data telegrams of a lower priority are being transmitted over the bus line at the same time.

DETAILED DESCRIPTION

Figure 1:
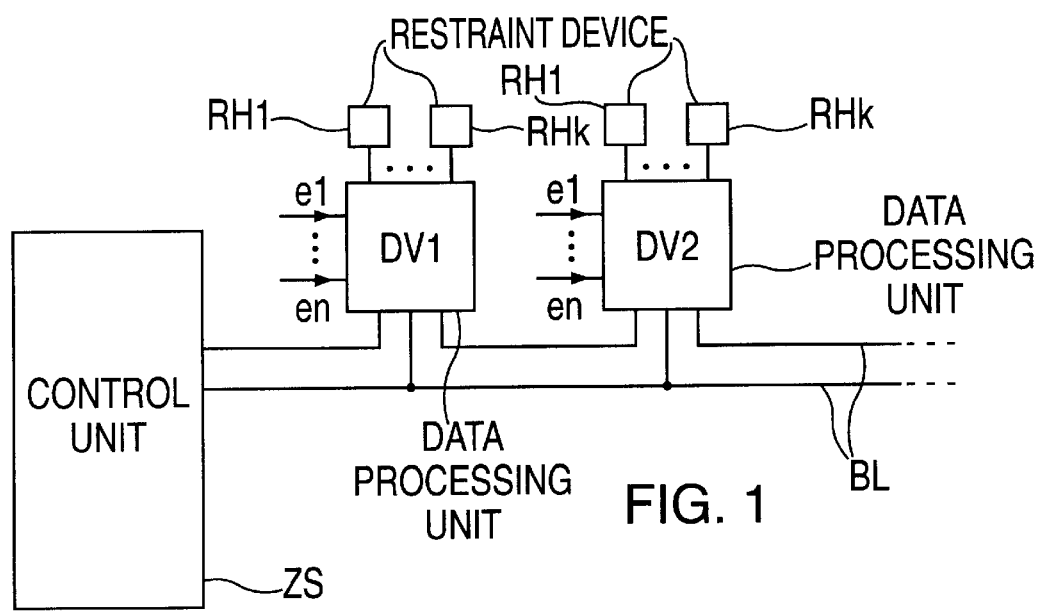
FIG. 1 shows a block schematic of a restraint system according to the present invention.

The restraint system illustrated in FIG. 1 includes a central control unit ZS to which several data processing units DV1, DV2 are connected by a bus line BL. Each of these data processing units DV1 and DV2, two are shown as an example in FIG. 1, is used to control one or more restraint devices RH1, . . . , RHk. As indicated in the introduction, these restraint devices RH1, . . . , RHk may include, for example, driver and front passenger airbags that can be deployed in one or more stages, knee bags, side air bags, seat belt tensioners, etc. In the embodiment of data processing units DV1, DV2 explained in even greater detail in conjunction with FIG. 2, other inputs el, . . . , en for other input signals, e.g., sensor signals, are also provided in addition to the inputs for bus line BL.

Figure 2:
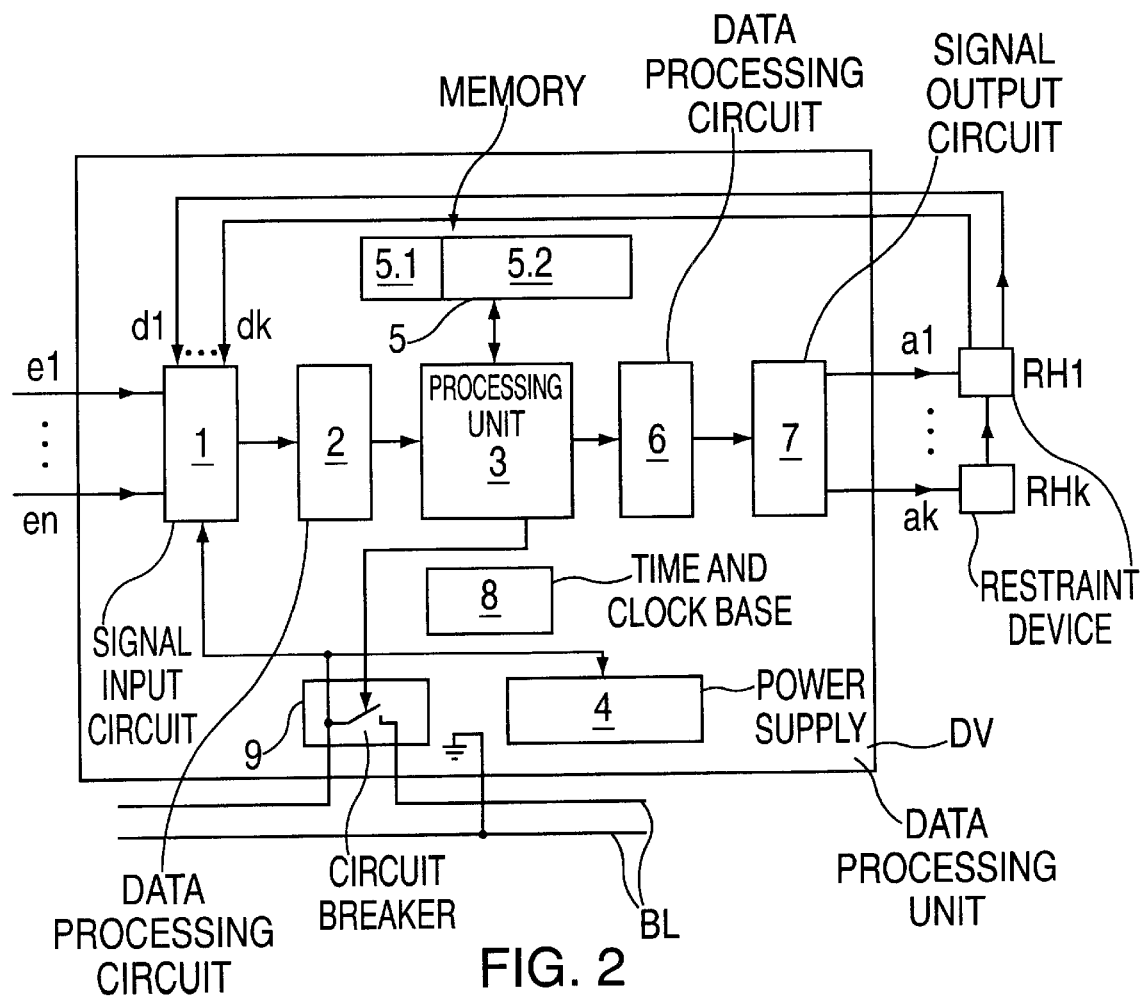
FIG. 2 shows a block schematic of a data processing unit according to the present invention.

In the embodiment illustrated in FIGS. 1 and 2, bus line BL is in the form of a spur line, but it may also be in the form of a ring line.

All data processing units DV1, DV2 have the same circuit structure. Therefore, one data processing unit DV will be described in detail and illustrated in FIG. 2 as representative of all data processing units. A plurality of restraint devices RH1, . . . , RHk are connected to this data processing unit DV. This group of k restraint devices RH1, . . . , RHk is preferably assigned to one occupant of the vehicle. If this is the front passenger, for example, restraint devices RH1, . . . , RHk might include a front airbag, one or two side airbags in the head and chest area, a knee bag and a seat belt tensioner, in which case all the airbags and the seat belt tensioner may also be deployed in multiple stages. For each of these restraint devices RH1, . . . , RHk, data processing unit DV generates a deployment signal a1, . . . , ak in the event of a crash, the choice of which restraint devices to deploy and the deployment times being made on the basis of multiple input signals el, . . . , en if the intent is for data processing unit DV to be active regardless of deployment commands from central control unit ZS. Input signals el, . . . en come from sensors which may include one or more acceleration sensors to detect the kinetic behavior of the vehicle in a crash, precrash sensors, seat belt lock sensors and seat occupancy sensors. Data processing unit DV determines from the seat occupancy sensors whether the front passenger seat is occupied at all, whether a child or an adult is sitting there and even the posture of the passenger, so that accordingly the only restraint devices deployed are those that can protect the occupant. Likewise, deployment of restraint devices is suppressed entirely if there is no occupant in the passenger seat or if there is a child seat or baggage in that seat.

In FIG. 2, the individual function elements within data processing unit DV are indicated in the form of blocks. There is a signal input circuit 1 for receiving analog or digital input signals el, . . . , en including signal drivers, for example. An analog-digital conversion of analog input signals can take place downstream in data processing circuit 2. In each case, data is processed here so that it can be processed further digitally by a downstream processing unit 3.

Processing unit 3 handles all control functions in data processing unit DV. For example, it determines from input signals el through en which of the connected restraint devices RH1, . . . , RHk is to be deployed at which times. Or processing unit 3 reacts to a deployment command received by data processing unit DV from central control unit ZS. Processing unit 3 also performs a diagnosis of the ignition elements in restraint devices RH1, . . . , RHk. For this purpose, diagnostic signals d1, . . . , dk, —which may be resistance values of the ignition elements, for example—are sent to signal input circuit 1. Processing unit 3 compares diagnostic signals d1, . . . , dk with reference values and issues an error message whenever there is an unacceptable deviation. A diagnosis of the reserve power in a power supply part 4 is also performed.

Data processing unit DV includes a memory unit 5 having both volatile memory registers (RAM) 5.1 and non-volatile memory registers (e.g., EPROM, EEPROM, PROM) 5.2. These memory registers contain, for example, the address of data processing unit DV, manufacturing data—such as the manufacturing date, the lot number, ASIC version and the like—diagnostic data—e.g., ignition element resistance values, power levels of the reserve power supply—plus optionally any other data necessary for operation of data processing unit DV. Some data, e.g., the address of data processing unit DV, is first entered into volatile memory registers and then transferred into non-volatile memory registers only when it is certain that there are no errors in the data.

Accordingly, the input side of data processing unit DV is followed at the output by a data processing circuit 6 and a signal output circuit 7 after processing unit 3. For example, in data processing circuit 6, digital deployment information or diagnostic inquiry signals from processing unit 3 are converted into ignition currents or test currents for the ignition elements of restraint devices RH1, . . . , RHk. Signal output circuit 7 is equipped with signal drivers.

A time and clock base 8 in data processing unit DV supplies all the function blocks with a uniform synchronous clock pulse.

The division of the function blocks shown in FIG. 2 is not obligatory, but merely illustrative. For example, signal input circuit 1 and data processing circuit 2 or signal output circuit 7 and data processing circuit 6 may be combined and even integrated into processing unit 3 to at least some extent. Likewise, power supply 4 and/or time and clock base 8 may be integrated into data processing circuits 2, 6. There are many possibilities for combining multiple functions in one circuit element.

Data processing unit DV may include an ignition power module having a relatively high level of intelligence, because it can decide autonomously, i.e., independently of control signals of central control unit ZS whether to deploy restraint devices RH1, . . . , RHk as a function of input signals el, . . . , However, it is not necessary for data processing units DV1, DV2 to have an autonomous decision making function. The following discussion is based on data processing units that receive deployment commands and diagnosis requests from central control unit ZS.

Each data processing unit has a circuit breaker 9 by means of which it can connect or disconnect bus line BL. Circuit breaker 9 is controlled by processing unit 3. A request to close or open circuit breaker 9 can be transmitted from central control unit ZS over bus line BL. It is thus possible to render a short circuit on the bus line ineffective by opening circuit breaker 9 of the data processing unit upstream from the short circuit. A certain selection of data processing units that can be addressed can also be made by means of the circuit breakers.

Central control unit ZS sends query signals or control signals to data processing units DV1, DV2, and the data processing units addressed send response signals back to central control unit ZS in response to some query signals. It is possible to send query signals or control signals to all data processing units DV1, DV2 connected to bus line BL at the same time or to direct query signals or control signals selectively to individual data processing units DV1, DV2.

Figure 3A:
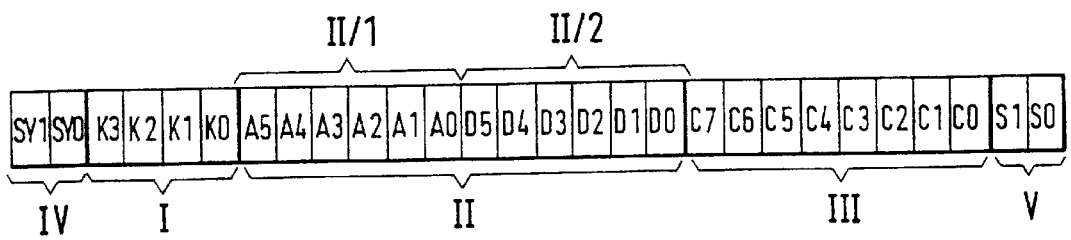
FIG. 3a illustrates a first embodiment of a data telegram according to the present invention.
Figure 3B:
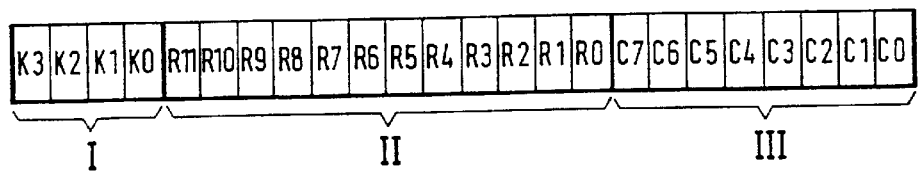
FIG. 3b illustrates a second embodiment of the data telegram according to the present invention.
Figure 3C:
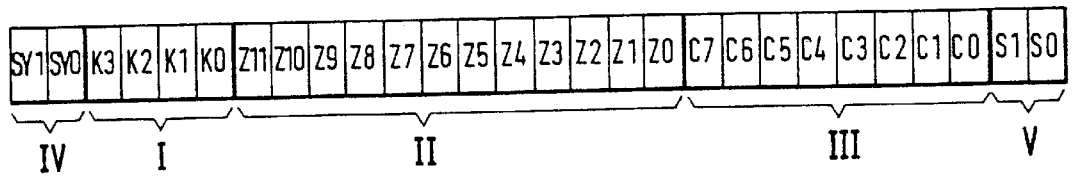
FIG. 3c illustrates a third embodiment of the data telegram according to the present invention.

The query signals or control signals sent out by central control unit ZS and the response signals of data processing units DV1, DV2 are data telegrams, all of which have the same frame structure, as illustrated in FIGS. 3a, 3b, 3c. This frame structure has a first region I with n control bits, a second region II with m information bits and a third region a III with p check bits. Control bits K0 through K3 in the data telegrams sent out by central control unit ZS indicate the type of query signals or control signals—e.g., deployment command, diagnostic query, memory register query, etc. In the response telegram, the data processing units indicate with control bits K1 through K3 whether or not they can correctly execute the query signals or control signals directed at them. The p check bits in region 3 of the data telegrams are CRC check bits (CRC=cyclic redundancy check) which check the bit pattern entered in region II for errors.

In the data telegrams sent out by central control unit ZS (FIGS. 3a, 3c), a region IV with synchronization bits SY0, SY1 precedes the frame structure described above, and a region V with a few stop bits S0, S1 is added to the end of the frame. The two bit regions IV and V are eliminated with a response telegram (FIG. 3b) sent out by data processing units DV1, DV2. Synchronization bits SY0 and SY1 in the data telegrams sent out by central control unit ZS to data processing units DV1, DV2 (FIGS. 3a, 3c) synchronize a time and clock base in the data processing units at the sampling frequency of central control unit ZS. Stop bits S0 and S1 at the end of the data frame for the query signals or control signals indicate to data processing units DV1, DV2 that they can send their response telegram back to central control unit ZS following these stop bits S0, S1 or in this period of time they can execute actions whose result can be sent immediately thereafter.

Some examples of data telegrams of query signals or control signals and response signals are described in greater detail below.

When central control unit ZS wants to inquire of a certain data processing unit DV1, DV2 regarding the contents of a selected memory register, it sends a query telegram according to FIG. 3a, in whose region II, namely in portion II/1 having bits A0 through A5, it enters the address of the data processing unit addressed. Bits D0 through D5 of portion II/2 of region II of the data frame in FIG. 3a receive the address of the memory register queried. The data processing unit addressed enters the contents of the memory register queried into region II having bits R0 through R11 of the response telegram.

If central control unit ZS requests a selected data processing unit to execute a self-diagnosis, it in turn writes the address of the selected control unit into bits A0 through A5 of region II/1 of its data telegram, and it writes a fixed predetermined bit combination which is the same for all data processing units to bits D0 through D5 of region II/2. This fixed predetermined bit combination D0 through D5 is then recognized by each data processing unit as a request to perform a self-diagnosis. At the next diagnosis request received from the central control unit by the data processing unit, it will send back the result of the diagnosis in its response telegram. Each bit here corresponds to the result of a diagnostic step. These diagnostic steps include, for example, the status of the circuit breaker or the resistance of the ignition element of a restraint device or the power level of the reserve power supply or the states of other different circuit elements in the data processing unit and the like.

If information is to be written by the central control unit into a certain register of a certain data processing unit, the control unit notifies the respective data processing unit of the address of the data processing unit addressed in bits A0 through A5 in its query telegram, and in bits D0 through D5 the address of the memory register to which the information is to be written with the next data telegram. The response telegram of the data processing unit contains the selected register address in region II as confirmation. The next data telegram sent out by the central control unit then contains in region II/2 the information that is to be written to the previously selected memory register. As confirmation, the data processing unit sends back the address of the respective memory register and the information written to it in bits R0 through R11 of its response telegram.

There are various working modes for data processing units DV1, DV2, including a normal mode, an individual mode and a hold mode. In normal operation, i.e., during normal driving operation of the vehicle, the data processing units are in normal mode. If there has been a previous reset of the data processing units, all the data processing units are in normal mode. The central control unit can also set all data processing units in normal mode by sending a broadcast data telegram to all data processing units at the same time. In this case, all bits A0 through A5 and D0 through D5 in region II of the data telegram are occupied with a fixed bit combination. A response telegram from the data processing devices is eliminated with a broadcast control signal.

Only one data processing unit on the bus line can be isolated by the individual mode. In individual mode, the respective data processing unit opens its circuit breaker so that the data stream and the power supply current in this data processing unit are interrupted. The individual mode can be established starting from the normal mode. The individual mode is used primarily to determine the actual status on the bus line. To activate the individual mode, the address of the selected data processing unit is written to bits A0 through A5, and bits D0 through D5 receive a fixed predetermined bit pattern which each data processing unit recognizes as a request to activate the individual mode. The respective data processing unit does not send back a response telegram.

In the hold mode, the data processing unit operates as in normal mode. The difference in comparison with normal mode is that in hold mode it rejects a command from the central control unit to activate the individual mode. As confirmation that it has activated the hold mode, the data processing unit also sends its address in bits R0 through R11 in its response telegram.

As mentioned above, memory unit 5 of each data processing unit DV contains a volatile memory area RAM and a non-volatile memory area. At the end of the band, the central control unit determines the number of built-in data processing units and establishes successively the bus line with the data processing unit connected to it on the basis of RAM addresses. Only if RAM operation is error free does it switch each data processing unit individually to the individual mode and order with this command the programming of the addresses in corresponding volatile memory registers. This command to write the volatile memory registers is issued by the central control unit to each individual data processing unit via a control telegram according to FIG. 3a, where bits A0 through A5 contain the address of the respective data processing unit and bits D0 through D5 are provided with a fixed bit pattern which stands for the command "write volatile memory register." A response telegram on the part of the data processing unit is not provided here.

If the normal power supply fails, the central control unit switches to emergency operation, i.e., the data processing units receive their power supply voltage from the vehicle's battery voltage. In order for all the data processing units to switch to this new power supply during emergency operation, the central control unit sends a control telegram for emergency operation to all the data processing units at the same time. This is a broadcast data telegram, where bits A1 through A5 and D0 through D5 receive a fixed predetermined bit pattern. Response telegrams on the part of the data processing units are not provided.

In the event of a crash involving the vehicle, central control unit ZS sends a deployment command as a function of various sensor signals to all the data processing units whose respective restraint devices must be deployed. The data telegram of a deployment command shown in FIG. 3c contains bits Z0 through Z11 in region II. Of these bits Z0 through Z11, one or more bit locations are allocated to each individual data processing unit. When this data telegram is sent out over the bus line, each data processing unit queries the bit location allocated to it or bit locations Z0 through Z11 and causes deployment of the restraint device(s) RH1, . . . , RHk belonging to it when the bit(s) assigned to it is/are set. A response telegram of the data processing units is not provided here.

To ensure that a deployment command will definitely reach the data processing devices even if other data telegrams are being transmitted over the bus line at the same time, the data telegram of a deployment command is transmitted with a higher signal level and at a higher bit rate than other data telegrams having a lower priority and a lower time urgency than a deployment command. In general, data telegrams with query signals or control signals having a high priority and a high time urgency will be transmitted with a higher signal level and at a higher bit rate than data telegrams with a lower priority and a lower time urgency.

What is claimed is:

1. A method of data transmission in a restraint system network over a bus line for occupants of a vehicle, comprising the steps of:

coupling a central control unit and a plurality of data processing units to the bus line;

providing, at various locations in the vehicle, the central control unit and the plurality of data processing units to control restraint devices;

sending, from the central control unit, at least one of query signals and control signals to at least one of particular data processing units and all data processing units;

sending, from the data processing units, response signals to the central control unit in response to at least one of particular query signals and particular control signals, the response signals and the at least one of the query signals and the control signals being data telegrams, the data telegrams having the same frame structure including a first region with n control bits, a second region with m information bits and third region with p check bits;

entering, by the central control unit, a deployment command into the second region with the m information bits of the data telegram in which each of the data processing units is allocated at least one bit location; and activating the restraint devices assigned to a particular data processing unit only when the at least one allocated bit location for the particular data processing unit has been set.

2. The method according to claim 1, further comprising the steps of:

placing synchronization bits in front of the data telegrams for the at least one of the query signals and the control signals; and adding stop bits at an end of a frame of the data telegrams for the at least one of the query signals and the control signals.

3. The method according to claim 1, further comprising the step of:

distinguishing between at least one of different query commands and different control commands via the control bits in the data telegrams.

4. The method according to claim 1, further comprising the step of:

notifying, by the data processing units, the central control unit via the control bits in the data telegrams for the response signals as to whether the data processing units can correctly execute the at least one of the query commands and the control commands.

5. The method according to claim 1, further comprising the steps of:

addressing the data processing units via a first portion of the m information bits of the data telegrams of the at least one of the query signals and the control signals; and at least one of (A) selecting at least one memory register of the addressed data processing unit via a second portion of the m information bits so that a content of the at least one selected memory register is sent to the central control unit with the response telegram and (B) requesting at least one data processing unit to execute a particular function via a second portion of the m information bits.

6. The method according to claim 5, further comprising the step of:

entering, by the data processing units, queried register contents into the second region of their response telegram having m information bits.

7. The method according to claim 5, further comprising the steps of:

at least one of (A) selecting, by the central control unit, a single data processing unit by addressing the single data processing unit via the first portion of the m information bits and (B) addressing simultaneously, in the first portion of the m information bits, all data processing units that are coupled to the bus line.

8. The method according to claim 1, further comprising the step of:

transmitting the data telegram of a first kind at a higher signal level and at a higher bit rate than the data telegram of a second kind, the data telegram of the first kind including at least one of the query signals and the control signals having a high priority and a high time urgency, the data telegram of the second kind including at least one of the query signals and the control signals having a lower priority and a lower time urgency.

9. A method of data transmission in a restraint system network over a bus line for occupants of a vehicle, comprising the steps of:

coupling a central control unit and a plurality of data processing units to the bus line;

providing, at various locations in the vehicle, the central control unit and the plurality of data processing units to control restraint devices;

sending, from the central control unit, at last one of query signals and control signals to at least one of particular data processing units and all data processing units;

sending, from the data processing units, response signals to the central control unit in response to at least one of particular query signals and particular control signals, the response signals and the at least one of the query signals and the control signals being data telegrams, the data telegrams having the same frame structure including a first region with n control bits, a second region with m information bits and third region with p check bits;

entering, by the central control unit, a deployment command into the second region with the m information bits of the data telegram in which each of the data processing units is allocated at least one bit location; and in response, to the deployment command activating the restraint devices assigned to a particular data processing unit only when the at least one allocated bit location for the particular data processing unit has been set.

* * * * *